United States Patent [19]

Pessot et al.

[11] Patent Number: 5,708,672
[45] Date of Patent: Jan. 13, 1998

[54] DUAL WAVELENGTH SOLID STATE LASER

[75] Inventors: Maurice A. Pessot, San Diego; David E. Hargis, La Jolla, both of Calif.

[73] Assignee: Laser Power Corporation, San Diego, Calif.

[21] Appl. No.: 593,251

[22] Filed: Jan. 29, 1996

[51] Int. Cl.$^6$ ..................................................... H01S 3/10
[52] U.S. Cl. ............................... 372/23; 372/70; 372/71; 372/92; 372/99
[58] Field of Search ................................ 372/23, 70, 71, 372/75, 92, 97, 9

[56] References Cited

U.S. PATENT DOCUMENTS

| | | | |
|---|---|---|---|
| 4,731,787 | 3/1988 | Fan et al. | 372/22 |
| 4,739,507 | 4/1988 | Byer et al. | 372/22 |
| 4,847,851 | 7/1989 | Dixon | 372/75 |
| 4,860,304 | 8/1989 | Mooradian | 372/92 |
| 4,879,723 | 11/1989 | Dixon et al. | 372/21 |
| 4,933,947 | 6/1990 | Anthon et al. | 372/34 |
| 4,942,582 | 7/1990 | Kintz et al. | 372/18 |
| 4,956,843 | 9/1990 | Akhavan-Leilabady et al. | 372/23 |
| 5,142,542 | 8/1992 | Dixon | 372/22 |
| 5,313,477 | 5/1994 | Esterowitz et al. | 372/6 |
| 5,365,539 | 11/1994 | Mooradian | 372/75 |
| 5,369,661 | 11/1994 | Yamaguchi et al. | 372/69 |

FOREIGN PATENT DOCUMENTS 5-341393   12/1993   Japan .

OTHER PUBLICATIONS de Barros et al., *Two-color Synchronously Mode-locked Femtosecond Ti:Sapphire Laser*, Optics Letters, vol. 18, No. 8 (Apr., 1993), pp. 631–633.

Dykaar et al., *Sticky Pulses: Two-color Cross-mode-locked Femtosecond Operation of a Single Ti:Sapphire Laser*, Optics Letters, vol. 18, No. 8 (Apr., 1993), pp. 634–636.

Evans et al., *Dual-wavelength Self-mode-locked Ti:Sapphire Laser*, Optics Letters, vol. 18, No. 13, (Jul. 1993), pp. 1074–1076.

Henderson, *A Computational Model of a Dual-wavelength Solid-state Laser*, J. Appl. Phys., vol. 68, No. 11 (Dec., 1990), pp. 5451–5455.

MacKinnon et al., *A Laser Diode Array Pumped, Nd:YVO$_4$/ KTP, Composite material Microchip Laser*, Optics Communicatiosn 105 (Feb. 1994), pp. 183–187.

Shen et al., *Comparison of Simultaneous Multiple Wavelength Lasing in Various Neodymium Host Crystals at Transitions from $^4F_{3/2}$–$^4I_{11/2}$ and $^4F_{3/2}$–$^4I_{13/2}$*, Appl. Phys. Lett., vol. 56, No. 20 (May, 1990), pp. 1937–1938.

(List continued on next page.)

*Primary Examiner*—James W. Davie
*Attorney, Agent, or Firm*—James D. McFarland

[57] ABSTRACT

A dual wavelength continuous wave (cw) solid state microlaser device that provides simultaneous laser action at a first and a second wavelength. The laser comprises a solid state gain material including a rare earth element having a first gain transition at the first wavelength and a second gain transition at the second wavelength. The gain material defines a block having a first face and a second, opposite face. A first reflective surface that is substantially reflective at both the first and second wavelengths is closely coupled to the first face. An output coupler provides a second reflective surface that is partially reflective at both the first and the second wavelengths, which is oriented with respect to the first reflective face to define an optical cavity through the first and second faces of the solid state gain material. An optical pump source is provided to end pump the solid state gain material with continuous pump radiation at a pump wavelength that is highly absorptive by the gain material. In some embodiments, the first reflective surface may be formed directly on the first face of the solid state gain material, and the second reflective surface may be formed directly on the second face of the solid state gain material. The resultant laser beam comprises two wavelengths each of which is believed to have a single longitudinal mode. In some embodiments the solid state gain material comprises a uniaxial crystal oriented within the optical cavity to provide polarized emissions for the first and second wavelengths.

37 Claims, 3 Drawing Sheets

OTHER PUBLICATIONS

Shen, *Oscillation Condition of Simultaneous Multiple Wavelength Lasing*, Chinese Phys. Lett. vol. 7, No. 4 (1990) pp. 174–176 (No Month).

Shen et al., *Twice Sum–frequency mixing of a Dual–wavelength Nd:YALO₃ Laser to get 413.7–nm Violet Coherent Radiation in LiIO₃ Crystal*, J. Appl. Phys., vol. 70, No. 3 (Aug., 1991), pp. 1880–1881.

Tomaschke, *Experimental and Theoretical Study of a Pulsed Dual Frequency Nd:YAG Laser with Intracavity Sum Frequency Mixing*, CLEO 1990, pp. 252–253 (No Month).

Zayhowski, *Microchip Lasers*, The Lincoln Laboratory Journal, vol. 3, No. 3 (1990) pp. 427–445 (No Month).

DUAL WAVELENGTH SOLID STATE LASER

BACKGROUND OF THE INVENTION

1. Field of the Invention

This invention relates generally to lasers, and more specifically to continuous-wave (cw) solid-state laser devices that are end-pumped with optical pumping radiation.

2. Description of the Related Art

A laser is a device that has an ability to produce monochromatic, coherent light through the stimulated emission of photons from atoms, molecules, or ions of an active gain material which have been excited from a ground state to a higher energy level by an energy input from a pump source. A laser includes an optically resonant cavity defined by highly reflective surfaces, such as mirrors, that form a closed, round trip path for light energy. A gain material having suitable pump absorption characteristics and a suitable lasing transition is situated within the optical cavity so that, by a process of stimulated emission, the light energy circulating within the optical cavity can be amplified during its repeated passages through the gain material.

One particularly useful type of laser is a diode-pumped solid-state laser, in which a laser diode generates a pump beam directed into the solid-state gain material. The pump beam is at least partially absorbed by the gain material, causing lasant ions to make a transition to a higher energy level. The pumped gain material, which is positioned within an optical cavity, supplies energy to produce laser radiation within the optical cavity. A variety of important applications, such as optical data storage, medical instrumentation, and communications have provided impetuses for the development of diode-pumped solid state lasers.

For small to moderate levels of optical power, one particularly useful diode-pumped solid-state laser is a microlaser, which comprises a short element of solid-state gain material positioned in a resonant cavity. The pump beam is supplied by a semiconductor device such as a diode laser. The diode laser pumps the solid-state gain material to a high energy level, which in turn supplies energy to support laser operation within the resonant cavity. Two opposing reflective surfaces define the resonant cavity within which the gain material is disposed. Typically, the opposing reflective surfaces are formed directly on opposing ends of the solid-state gain material, and the resulting structure is compact and reliable.

Lasant materials commonly used in such solid-state lasers include crystalline or glassy host materials into which an active material, such as trivalent neodymium ions, is incorporated. One common gain material is $Nd^{3+}$-doped yttrium aluminum garnet (Nd:YAG) which has been diode laser pumped and has been made to lase at either 1338 nm, 1064 nm, or 946 nm. Usually, any particular diode-pumped solid state laser is specifically designed to lase at only one of these wavelengths by suppressing all other wavelengths using conventional loss-inducing mechanisms.

Simultaneous lasing at multiple wavelengths has been of interest for some uses such as laser medical applications and research on nonlinear optical mixers. Mostly, research has been directed to obtaining pulsed operation, as opposed to cw operation. Pulsed operation is much easier to obtain and completely different than cw operation. For example, Henderson *A Computational Model of a Dual-Wavelength Solid-State Laser,* J.Appl Phys. 68, 5451 (1990), and Evans, et al., *Dual-Wavelength Self-Mode-locked Ti:Sapphire Laser,* Opt. Lett. 18, 1074 (1993)) disclose pulsed two wavelength operation in laser systems in which both wavelengths share the gain medium, but have two separate laser cavities in order to permit independently controlling the loss for each wavelength.

Dykaar, *Sticky Pulses: Two-color Cross-mode-locked Femtosecond Operation of a Ti:Sapphire Laser,* Opt. Lett. 18, 634 (1993), teaches using separate volumes of the same gain media along with separate laser cavities to obtain two wavelength operation. In U.S. Pat. No. 4,956,843, Akhavan-Leilabady discloses a two-laser system in which two separate gain media are pumped in series with a single source to generate two wavelengths, one from each cavity. These two wavelengths do not share a common cavity, and do not share a common gain volume.

de Barros, *Two-color Synchronously Mode-locked Femtosecond Ti:Sapphire Laser,* Opt. Lett. 18, 631 (1993)) discloses pulsed dual wavelength operation in a single cavity, in the context of a mode-locked Ti: Sapphire laser pumped by a continuous laser source.

Shen et al., in *Comparison of Simultaneous Multiple Wavelength Lasing in Various Neodymium Host Crystals at Transitions from $^4F_{3/2}-^4I_{11/2}$ and $^4F_{3/2}-^4I_{13/2}$,* Appl. Phys. Lett. 56 (20), p. 1937 (1990), and *Oscillation Condition of Simultaneous Multiple Wavelength Lasing,* Chinese Phys. Lett., Vol. 7, No. 4 pp. 174–176 (1990), discloses two-wavelength cw operation using side lamps in a single neodymium-doped yttrium aluminate (Nd:YAP) rod. Particularly, Shen reports obtaining continuous-wave (cw) multiple wavelength operation using a Nd:YAP rod having a 5 mm diameter and a 104 mm length, in the $\alpha$ axis doped with 1% $Nd^{3+}$ ions using a shared cavity defined by two external mirrors.. The Nd:YAP rod whose formula is $Nd:AlO_3$ was coated with a broadband antireflective film on both end surfaces. Partially reflecting mirrors were utilized. The cavity mirrors included a back mirror with reflectivities of 98% and 100%, and an output mirror with the reflectivities of 89% and 98.5% for 1.0759 and 1.3414 µm, respectively. Shen recognizes that dual wavelength operation of Nd host crystals is easier to accomplish with pulsed operation. Furthermore, Shen states that, of the crystals studied, cw operation is only possible with YAP, and is not possible with the other crystals studied.

As discussed above, a typical diode-pumped solid state laser lases at only one wavelength, a result caused by sufficiently suppressing all other significant wavelength transitions by loss-inducing mechanisms, etalons, or other techniques. Actually, it is a misnomer to refer to such a laser as "single wavelength" because many closely spaced wavelengths (longitudinal modes) can lase simultaneously. Unfortunately, many of the longitudinal modes compete for gain, interfere with each other, and thereby degrade desired output beam quality. To avoid these problems and others, much effort has been directed to providing single longitudinal mode operation of one of the lasing transitions.

To provide single mode operation, Mooradian has disclosed in U.S. Pat. No. 4,860,304 a microlaser employing a gain material made from Nd:YAG that has a very small cavity length (less than 700 µm). In Zayhowski, *Microchip Lasers,* The Lincoln Laboratory Journal, Vol. 3, No. 3, pp. 427–445 (1990), the demonstration of single-frequency microchip lasers which use a miniature, monolithic, flat-flat, solid-state cavity whose mode spacing is greater than the gain bandwidth of the gain material, is reported. These microchip lasers are longitudinally pumped with the close-coupled, unfocused output of a laser diode.

Kintz et al., in U.S. Pat. No. 4,942,582 disclose generating a single frequency, single longitudinal mode output from a microlaser by end-pumping highly absorbing lasant material through an input mirror that is closely situated to the end-pumped gain material. Thus, it is known that a highly absorbing gain material promotes single mode operation, but not that dual wavelength operation is possible.

SUMMARY OF THE INVENTION

A microlaser device is described that provides simultaneous laser action at a first and a second wavelength corresponding to a first and second transition of the lasant material. The resultant output laser beam comprises two wavelengths, each of which is believed to be substantially single longitudinal mode. Furthermore, in some embodiments, a polarized emission is provided.

The dual wavelength continuous wave (cw) solid state laser comprises a solid state gain material having a first gain transition at a first wavelength and a second gain transition at a second wavelength. Preferably, the solid state gain material comprises a rare earth element and particularly, a highly absorbing material, such as neodymium-doped yttrium orthovanadate (Nd:YVO$_4$.) The gain material defines a block having a first face and a second, opposite face. A first reflective surface that is substantially reflective at both the first and second wavelengths is closely coupled to the first face. An output coupler provides a second reflective surface that is partially reflective at both the first and the second wavelengths. The second reflective face is oriented with respect to the first reflective face to define an optical cavity through the first and second faces of the solid state gain material. An optical pump source is provided to end pump the solid state gain material with continuous pump radiation at a pump wavelength that is highly absorptive by the gain material.

In some embodiments, the first reflective surface may be formed directly on the first face of the solid state gain material, and the second reflective surface may be formed directly on the second face of the solid state gain material. Also, in some embodiments the solid state gain material may comprise a uniaxial crystal oriented within the optical cavity to first and second lasing polarizations for the first and second wavelengths.

BRIEF DESCRIPTION OF THE DRAWINGS

The objects, advantages and features of this invention will be more readily perceived from the following detailed description, when read in conjunction with the accompanying drawing, in which.

DETAILED DESCRIPTION OF THE PREFERRED EMBODIMENTS

Laser radiation produced by a lasant material in an optical cavity can be single longitudinal mode in character or it can have two or more longitudinal modes. Except where specific reference is made to the longitudinal mode structure, reference herein to laser radiation as having a specific frequency or specific wavelength will be understood to include one or more of the longitudinal modes of substantially the same frequency which are generated by the lasant material and are supported within the optical cavity. While this invention is susceptible of having many different forms, described herein are specific exemplary embodiments of the invention.

Figure 1:
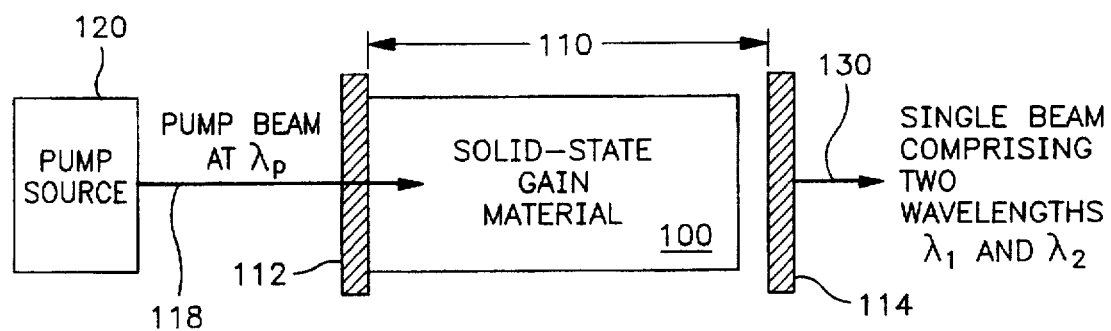
FIG. 1 is a schematic diagram of a dual frequency microlaser in accordance with the invention.

Referring now to the drawings, and more particularly to FIG. 1 thereof, the dual wavelength laser of the invention includes a solid-state gain (or "lasant") material 100 disposed within an optical cavity 110 defined by two dual wavelength reflectors 112 and 114. A pump beam 118 is generated by a suitable pump source 120, and applied to end pump the solid state gain material 100 through the input reflector 112. A beam of laser radiation comprising two wavelengths is generated in the optical cavity 110, and a dual wavelength output 130 is supplied through the output reflector 114.

The solid-state gain material 100 is selected to be a type that has at least two separate lasing transitions, and therefore, can lase at two separate, distinct wavelengths. The dual wavelength reflectors 112 and 114 have reflectivities designed to reflect both of those wavelengths. A preferred solid-state gain material include a rare-earth ion, such as trivalent neodymium (Nd$^{3+}$), doped into a suitable host material such as YVO$_4$ and yttrium lithium fluoride whose formula is YLiF$_4$ ("YLF"). In such materials, the Nd$^{3+}$ ion has at least two possible lasing transitions: for example, in YVO$_4$, neodymium has a first lasing transition at around 1064 nm (the $^4F_{3/2}$ to $^4I_{11/2}$ transition) and a second lasing transition at around 1342 nm (the $^4F_{3/2}$ to $^4I_{13/2}$ transition).

Other suitable solid lasant materials include substances wherein the active material is a stoichiometric component of the lasant material such as, neodymium pentaphosphate, and lithium neodymium tetraphosphate ("LNP"). Detailed summaries of conventional solid lasant materials are set forth in the *CRC Handbook of Laser Science and Technology*, Vol. I, M. J. Weber, Ed., CRC Press, Inc., Boca Raton, Fla., 1982 pp. 72–135 and in Kaminskii, *Laser Crystals*, Springer Series in Optical Sciences, Vol. 14, D. L. Mac-Adam, Ed., Springer-Verlag, 1981.

Referring still to FIG. 1, the resonant optical cavity 110 of the laser is defined by the input reflector 112, closest to the pump beam, and by the output reflector 114, distal thereto, through which the dual wavelength output beam 130 is supplied. The input reflector 112 has a high reflectivity at the two fundamental wavelengths produced by lasing the gain material (e.g., 1064 nm and 1342 nm where a gain material of Nd:YVO$_4$ is used) to support lasing action within the optical cavity 110. Also, the input reflector 112 has a high transmission at the pumping wavelength (e.g., 809 nm for a conventional laser diode used as a pumping source) to allow the pumping radiation 118 to reach the solid state lasant material 100. The output reflector 114 is partially reflective at both fundamental wavelengths in order to provide high intensity intracavity radiation that supports lasing action, while allowing sufficient radiation to leak through to provide an output. In order to approximately balance the gain curves for each of the two output wavelengths (which define the net gain within the cavity, taking into account intracavity losses and gain from the lasant material for each wavelength) the reflectivities of each respective wavelength at the output coupler can be varied. For example, the output coupler's reflectivity at 1064 can be made less than that at 1342 nm to introduce higher losses at 1064 to compensate for the stronger transition at 1064. As a result, the gain curves respectively corresponding to the first lasing transition and the second lasing transitions can be approximately made equal. However, it is not necessary that the gain curves be exactly equal. The following discussion demonstrates how the reflectivities should be set to optimize dual-wavelength lasing operation.

Let $\sigma$ and $r$ be, respectively, the stimulated emission cross-section and the mirror reflectivity, with the subscripts 1 and 2 used to denote these qualities at the two different laser frequencies of interest. For a given mirror reflectivity $r_1$ at a first frequency $v_1$, for dual wavelength operation the mirror reflectivity $r_2$ at a second frequency $v_2$ is approximately:

$$\ln\left(\frac{1}{r_2}\right) = 2\alpha L \left(\frac{\sigma_2}{\sigma_1} - 1\right) + \frac{\sigma_2}{\sigma_1} \ln\left(\frac{1}{r_1}\right) \quad \text{(Eqn. 1)}$$

where $\alpha$ is the loss coefficient of the gain medium at length L. The above equation assumes $\sigma_2$ is the stronger emission cross-section. The essence of the above equation is that a functional relationship exists between the desired reflectivities. In practice one would maximize the reflectivity for the weaker line ($r_1$) and then design $r_2$ to satisfy the above relationship.

In one embodiment, the solid-state gain material 100 defines a block having two opposing faces. Preferably, the block has the form of a thin etalon. The term "etalon" generally refers to a block with parallel faces and the term "thin" as used herein means an etalon preferably less than about 2.0 mm thick. Since it is not necessary that the crystal faces of the gain material be parallel in every embodiment, the term "block" will be used in some instances to refer to the element more broadly. In the preferred embodiment, the block of gain material comprises a rare-earth-doped crystal etalon with two opposite, flat, parallel, polished faces. Due to material limitations at the present time, the gain material would not be likely to function as desired if it were thinner than 0.1 millimeters.

The input reflector 112 is coupled closely to the solid state gain material 100 in order to "pin" (or locate) the gain as closely as possible to the input reflector, which defines one end of the optical cavity 110. Advantageously, pinning the gain close to the input reflector 112 promotes single longitudinal mode operation of both the first and the second wavelengths. In a preferred embodiment, the input reflector 112 is formed directly on a first face of the block of gain material. Furthermore, in some embodiments, the output reflector 114 is formed directly on the opposing face. In other embodiments, one or both of the reflectors may comprise a separate substrate of, for example, a high quality optical glass, and a reflective surface formed thereon. Different reflector configurations are illustrated and discussed more fully with reference to the embodiments of FIGS. 3, 4, and 5.

As discussed briefly above, the pump source 120 supplies the pump beam 118 to the solid-state gain material 100, thereby providing energy to raise the lasant mechanism (e.g., $Nd^{3+}$ ions within a crystal lattice) to a higher energy level. Preferably the pump beam 118 is supplied longitudinally, i.e., substantially parallel with the optical cavity 110. For most efficient operation, the pumping radiation emitted by the optical pump source should be matched with a suitable absorption band of the lasant material. However, any device producing optical pumping radiation having a wavelength effective to pump the lasant material can be used as the pump source in the practice of this invention. Preferably, as discussed in detail with reference to FIG. 6, the pumping radiation is strongly absorbed by the lasant material and therefore the pumping radiation is absorbed quickly in a short depth. For example, in $Nd:YVO_4$, a wavelength of 809 nm is strongly absorbed.

Suitable optical pumping sources include laser diodes, laser diode arrays, and light-emitting diodes (LEDs), including super-luminescent diodes and super-luminescent diode arrays and laser diode arrays. LEDs and laser diodes are available which, as a function of composition, produce output radiation having a wavelength within a range from about 630 nm to about 1600 nm. For the solid-state gain material $Nd:YVO_4$, for example, a suitable pump source is a laser diode that emits a near-infrared wavelength. For example, the wavelength of the output radiation from an aluminum gallium indium phosphide (AlGaInP) based device can be varied from about 630 nm to about 700 nm by variation of the device's composition. Similarly, the wavelength of the output radiation from a gallium aluminum arsenide (GaAlAs) based device can be varied from about 750 nm to about 900 nm by variation of the device's composition. Also, indium gallium arsenic phosphide (InGaAsP)-based devices can be used to provide radiation in the wavelength range from about 1000 nm to about 1600 nm.

Usually, a laser diode is attached to a heat sink which cools the laser diode during operation. Such cooling devices are commonly attached to a heat sink and packaged in a metal housing together with the laser diode. In some embodiments the heat sink can be passive in character, and in other embodiments the heat sink can comprise a thermoelectric cooler or other active temperature regulation system to help maintain the laser diode pumping source at a constant temperature and thereby ensure optimal operation of the laser diode at a constant wavelength. Any heat sink, thermoelectric cooler (TEC) or packaging that may be associated with a laser diode, a light-emitting diode, or an array of laser diodes or light-emitting diodes, is also included, all being conventional and readily understood by a person of ordinary skill in the art.

Figure 2:
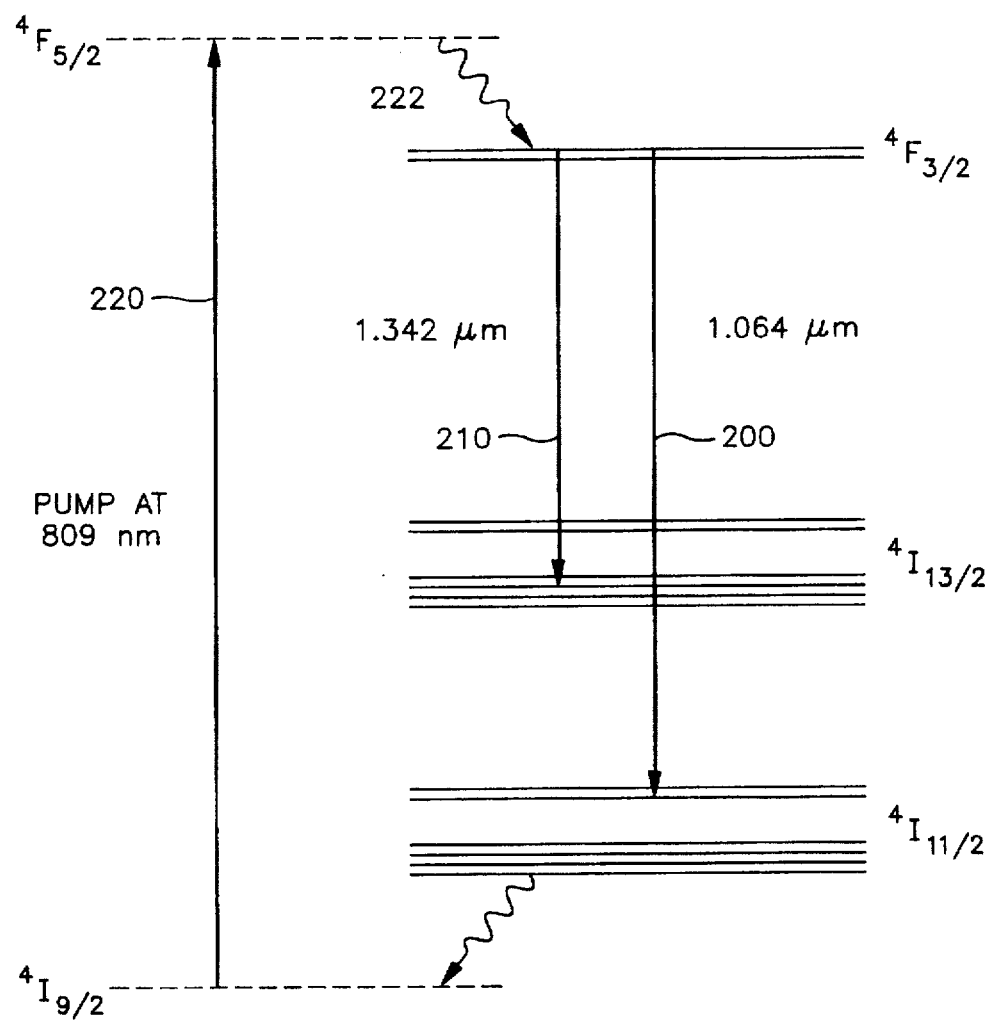
FIG. 2 is an energy level diagram of neodymium orthovanadate (Nd:YVO$_4$)

Reference is now made to FIG. 2, which is an energy level diagram of the solid state gain material $Nd:YVO_4$. The energy level diagram shows that at least two substantial lasing transitions are possible: the $^4F_{3/2}$ to $^4I_{11/2}$ transition (1064 nm) shown at 200 and the $^4F_{3/2}$ to $^4I_{13/2}$ transition (1342 nm) shown at 210. In operation, as shown at 220, the pump radiation at 809 nm raises the energy level of the lasant ions to a high level, and then by a process of phonon decay 222, their energy level drops to the $^4F_{3/2}$ level. From this next level, the lasant ion can have at least two possible transitions: the first transition 200 at 1064 nm and the second transition 210 at 1342 nm. Thus, the first lasing transition provides the first wavelength and the second lasing transition provides the second wavelength. The first lasing transition at 1064 is stronger than the 1342 nm transition.

Figure 3:
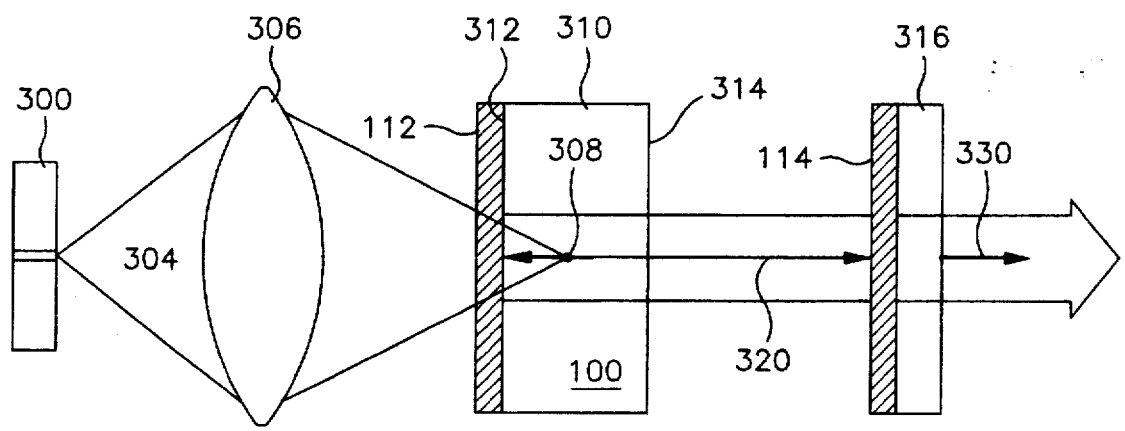
FIG. 3 is an embodiment of the dual wavelength microlaser of the invention in which the pump beam is lens coupled into the solid state gain medium.
Figure 4:
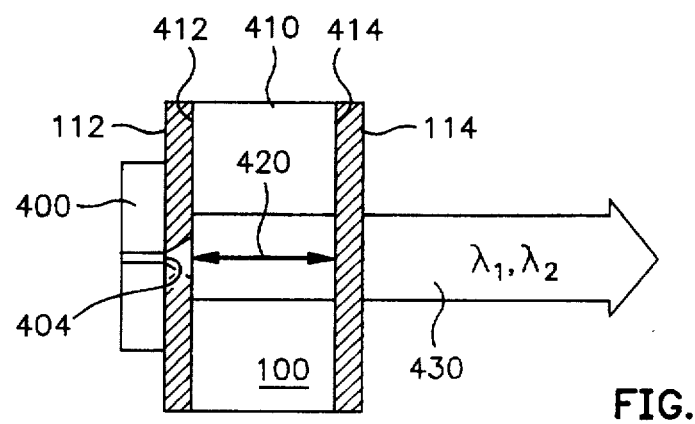
FIG. 4 is an alternative embodiment of the dual wavelength microlaser of the invention in which the pump beam is butt-coupled into the solid-state gain medium.
Figure 5:
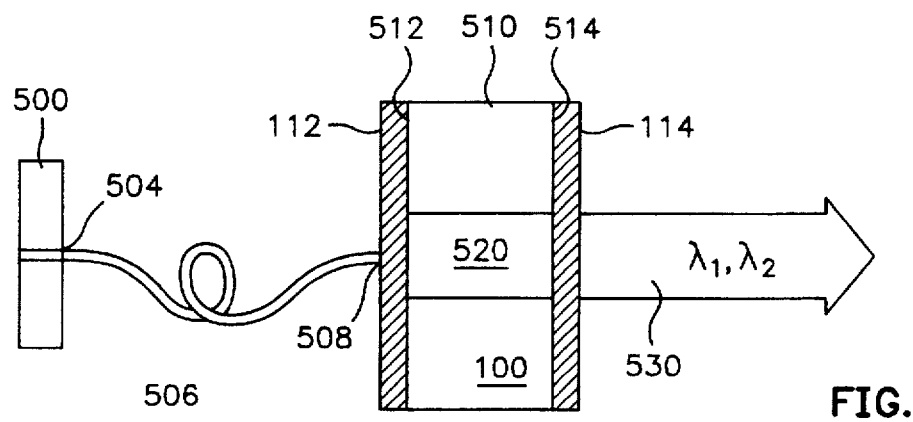
FIG. 5 is another alternative embodiment of the dual wavelength microlaser in which an optical fiber is utilized to transmit the pump beam from the pump source into the solid-state gain medium.

FIGS. 3, 4, and 5 show several different configurations of gain material, reflectors, and couplers for coupling the optical pumping radiation from the semiconductor light source into the gain material. Each provides high intensity pumping radiation where it interacts with the gain material, thereby providing a high photon-to-photon conversion efficiency in the lasant material.

Reference is now made to the embodiment of FIG. 3, which illustrates a "lens-coupled" configuration for coupling the output of a pump source comprising a semiconductor laser diode 300 into the gain material 100. The semiconductor laser diode 300, which has a narrow aperture, supplies a rapidly diverging beam 304 to a lens 306 that focuses the beam at a focal point 308 within the gain material 100. The term "lens" as used herein is defined to comprise any conventional focusing device such as a gradient index (i.e., GRIN) lens, a ball lens, an aspheric lens, an optical fiber positioned cross-wise, or a combination of lenses.

In the embodiment of FIG. 3, the gain material 100 is formed in a block 310 that includes a first face 312 and a second, opposing face 314. The input reflector 112 is coated directly on the first face 312. The second face 314 is anti-reflection coated for transmission at both fundamental wavelengths. The output reflector 114 is formed on a suitable optical substrate 316, such as BK-7 glass. Advantageously, in some circumstances it is easier to form a reflective coating on an optical surface such as glass rather than on a typical solid state crystal. Thus, an optical cavity 320 is defined between the input reflector 112 and the output reflector 114. Preferably, the laser diode 300, the lens 306, and the gain material 310 are all positioned so that the focal point of the lens 306 is situated within the gain material 100 but still close to the face 312.

In operation, the lens 306 focuses the pump beam 304 through the input reflector 112 and into the block 310, where it pumps the lasant ions to a high energy level. Focusing the output radiation advantageously provides high pumping intensity within the gain material 100, which results in a very high photon-to-photon conversion efficiency. Furthermore, in some embodiments, the focal point is positioned to provide a very small cross-sectional area so that approximately only one single transverse mode of laser operation (i.e. TEM$_{00}$ mode) is supported. To most efficiently accomplish such single transverse mode operation, optical pumping radiation is delivered directly along a longitudinal optical path in the lasant material.

In response to sufficient pumping, laser operation ensues within the optical cavity 320, generating a single beam 330 of laser radiation having components that include both the first and the second wavelengths.

FIG. 4 illustrates a preferred embodiment in which the pump source includes a semiconductor light source 400, preferably a laser diode, that has an output facet 404 situated in a "butt-coupled" configuration with respect to the gain material 100, which obviates the need for a lens. In the preferred embodiment of FIG. 4, the gain material 100 is formed in a block 410 that includes a first face 412 and a second, opposing face 414. The input reflector 112 is coated directly on the first face 412, and the output reflector 114 is coated directly on the second face 414, defining an optical cavity 420 between the input reflectors.

In this butt-coupled configuration, the output facet of the laser diode 400 is closely coupled to the input reflector 112 and the first face 412 of the block 410. Specifically, the output facet 404 is sufficiently close that the rapidly diverging beam of optical pumping radiation emanating therefrom optically end-pumps only a small transverse cross-sectional area within the block 410 of lasant material and supplies sufficient intensity within the gain material 100 to provide a high photon-to-photon conversion efficiency. Preferably, the output facet 404 is close enough to support essentially only one single transverse mode of laser operation (i.e., TEM$_{00}$ mode operation). In response to sufficient pumping, laser operation ensues within the optical cavity 420, generating a single beam 430 of laser radiation having components that include both the first and the second wavelengths. Advantageously, the embodiment of FIG. 4 provides a compact package that is efficient, cost-effective, and reliable in operation. Furthermore, because both reflectors 112 and 114 are bonded to the block 410 of gain material, and also because the laser diode 400 is coupled directly to the reflector 112 on the block 410, the laser is not subject to misalignment problems that can occur in other embodiments when one or both reflectors are separated from the gain material or when the pump source is not structurally coupled to the block.

Reference is made to FIG. 5 in which the pump source includes a semiconductor light source 500, preferably a laser diode, that has an output facet 504 optically coupled to an optical fiber 506 that, on an output end 508, is coupled into the gain material 100. In this embodiment, the gain material 100 is formed in a block 510 that includes a first face 512 and a second, opposing face 514. The input reflector 112 is coated directly on the first face 512, and the output reflector 114 is coated directly on the second face 514, defining an optical cavity 520 between the reflectors.

In the fiber-coupled configuration of FIG. 5, the output end of the fiber 506 is closely coupled to the input reflector 112 and the first face 512 of the block 510 so that the diverging beam of optical pumping radiation emanating therefrom optically end-pumps only a small transverse cross-sectional area within the block 510 of lasant material and thereby provides a high photon-to-photon conversion efficiency. When properly coupled, a fiber-coupled configuration can provide a pumping spot small enough to efficiently accomplish single transverse mode laser operation (i.e., TEM$_{00}$ mode operation).

After the gain medium has been sufficiently pumped through the fiber 506, laser operation ensues within the optical cavity 520, generating a single beam 530 of laser radiation having components that include both the first and the second wavelengths. Advantageously, the embodiment of FIG. 5 provides a system that is efficient, cost-effective, and reliable in operation for some uses. The fiber optic link allows the laser diode to be physically separated from the gain material block 510, which can be advantageous for some applications. Because both reflectors 112 and 114 are bonded to the block 510 of gain material, the laser is not subject to misalignment problems that can occur in other embodiments when one or both reflectors are separated from the gain material.

Figure 6:
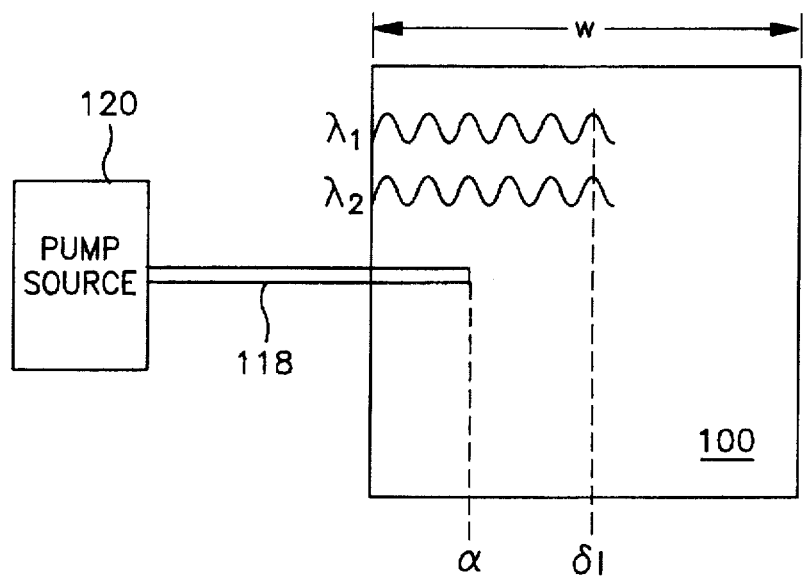
FIG. 6 is a diagram illustrating absorption of a highly absorptive pump wavelength in gain material.

Reference is now made to FIG. 6 which shows the high absorption of the pump wavelength in the solid state-gain material. Two characteristics of the device act in concert to enable dual wavelength operation: the reflectivities of the crystals are optimized for two wavelength operation, as discussed with reference to FIG. 1, and the oscillating wavelengths are sufficiently different that they fall out of phase in a distance small compared to the absorption depth of the gain material as will now be discussed. The gain material 100 is optically pumped by the pumping source 120 at a wavelength $\lambda_{pump}$ that matches a suitable absorption band of the gain material. Preferably, the pumping radiation is strongly absorbed by the lasant material and as a result, its absorption depth is small.

The wavelength separation of the two oscillating modes and their relationship to the absorption depth of the pump radiation facilitates efficient dual wavelength operation. When the wavelength $\lambda_1$ begins to oscillate in the laser, a spatially dependent distribution of the gain results, in conformance with the standing wave pattern of the oscillating wavelength $\lambda_1$. This spatial distribution is further modified by the exponential absorption of the pump radiation so that only one longitudinal mode at $\lambda_1$ oscillates (that at the longitudinal mode closest to the highest point under the gain curve of the material centered at $\lambda_1$). For wavelength $\lambda_2$ to oscillate, it must be able to effectively access the gain in those regions where the oscillating intensity of $\lambda_1$ is low. For this to occur the two wavelengths $\lambda_1$ and $\lambda_2$ must accumulate a sufficient phase differential ($\delta l$) in a distance small compared to the active length (i.e. the pumped length) of the gain material. This can be stated mathematically:

$$\delta l \equiv \frac{\lambda_1 \lambda_2}{2n(\lambda_2 - \lambda_1)} << \frac{1}{\alpha} \qquad \text{(Eqn. 2)}$$

where $\delta l$ is the phase differential and is approximately equal to the distance which $\lambda_1$ and $\lambda_2$ are 180° out of phase, $n \approx 2$ is the index of refraction of the gain material and $\alpha$ is its absorption coefficient for the pump radiation. Thus, if the wavelength separation of the two oscillating modes is sufficiently large, then this condition can be satisfied in a gain material that is highly absorbing to the pump radiation for example, if $\lambda_1=1064$ nm and $\lambda_2=1342$ nm, then $\delta l=1284$ nm and $\alpha$ must be much less than 7788 cm$^{-1}$.

Figure 7:
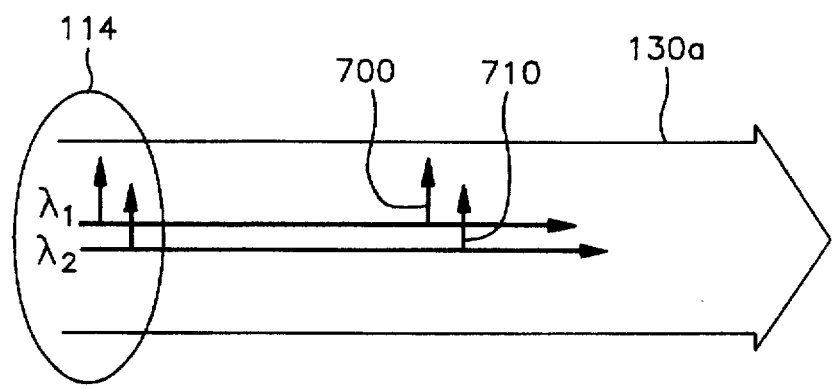
FIG. 7 is a diagram illustrating a parallel polarization of dual wavelengths in the optical cavity of the invention.
Figure 8:
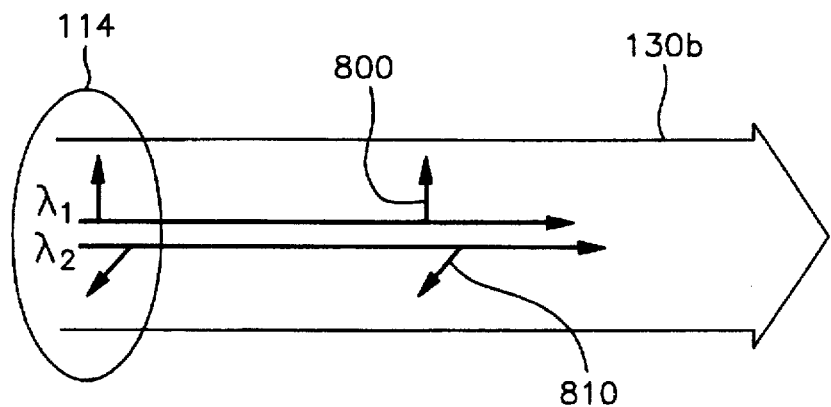
FIG. 8 is a diagram of perpendicularly polarized dual wavelengths in the optical cavity of the invention.

FIG. 7 and FIG. 8 represent the different polarizations that can be obtained using gain crystals that have preferred lasing orientations.

FIG. 7 illustrates a dual output beam 130 emanating from the output coupler 114. Within a beam 130a, the first wavelength $\lambda_1$ is illustrated as having a polarization illustrated by an arrow 700 that is parallel to the polarization illustrated by the arrow 710 for $\lambda_2$. Thus, the first wavelength has a polarization that is parallel to that of the second wavelength. It will be recognized by one skilled in the art that the polarizations may not be exactly parallel. For example, in one embodiment a gain material of Nd:YVO$_4$ is oriented within the cavity so that the c-axis is perpendicular to the propagation axis of the beam within the laser cavity. The pump beam is applied to the gain material so that its polarization is parallel with the c-axis. The preferred polarization for both emissions (at 1064 nm and 1342 nm) is parallel to the c-axis, and therefore the output beam 130 has the parallel polarizations illustrated in FIG. 7.

FIG. 8 represents a configuration in which the first wavelength $\lambda_1$ has a polarization illustrated by the arrow 800 while the second wavelength $\lambda_2$ has a polarization 810 perpendicular to polarization 800. This polarization is achieved by selecting a particular crystal orientation for the gain material within the optical cavity to provide the preferred polarizations. For example, in ND:YLF the strongest transition from the $^4F_{3/2}$ to the $^4I_{13/2}$ level at 1314 nm is found to be polarized perpendicular to the crystal c-axis, while the strongest transition from the $^4F_{3/2}$ to the $^4I_{11/2}$ level at 1047 nm is found to be parallel to the crystal c-axis. Thus, the two possible lasing wavelengths are perpendicular to one another. In an alternative embodiment using Nd:YLF, if the crystal is oriented within the cavity so that the a-axis of the crystal is aligned with the intra-cavity beam, then the output polarizations of the two wavelengths will be perpendicular as shown in FIG. 8.

By way of further example, certain specifications and characteristics are set forth for enhanced understanding of the invention. However, description of the device utilizing these materials is meant to illuminate, and not to limit, the invention.

What is claimed is:

1. A dual wavelength continuous wave (cw) solid state laser device comprising:

a solid state gain material having a first gain transition at a first wavelength and a second gain transition at a second wavelength, said gain material defining a block having a first face and a second, opposite face;

a first reflective surface closely coupled to said first face, said first reflective surface being substantially reflective at both said first and said second wavelengths; and an output coupler including a second reflective surface that is partially reflective at both said first and said second wavelengths, said second reflective face oriented with respect to said first reflective face to define an optical cavity through said first and second faces of said solid state gain material.

2. The solid state laser device of claim 1, and further comprising an optical pump source optically coupled through said first reflective face to end-pump said solid state gain material with continuous pump radiation at a pump wavelength that is highly absorptive by said gain material.

3. The solid state laser device of claim 2, wherein said first face of said solid state gain material is highly transmissive to said pump radiation and wherein said first reflective surface is formed on said first face.

4. The solid state laser device of claim 2, and further comprising an optical fiber having a first end coupled to said optical pump source and a second end coupled to said first reflective surface, so that said pump radiation is supplied through said optical fiber to pump said solid state gain material.

5. The solid state laser device of claim 1, wherein said first reflective surface is formed on said first face of said gain material.

6. The solid state laser device of claim 5, wherein said second reflective surface is formed on said second face of said gain material.

7. The solid state laser device of claim 1, wherein said second reflective surface is formed on said second face of said gain material.

8. The solid state laser device of claim 1, wherein said solid state gain material comprises a rare earth element.

9. The solid state laser device of claim 8, wherein said rare earth element comprises neodymium.

10. The solid state laser device of claim 8, wherein said solid state gain material comprises Nd:YVO$_4$.

11. The solid state laser device of claim 1, wherein said solid state gain material comprises a uniaxial crystal oriented within said optical cavity to provide said first and second lasing polarizations for said first and said second wavelengths.

12. The solid state device of claim 11, wherein said uniaxial crystal is doped with a rare earth element.

13. The solid state laser device of claim 12, wherein said rare earth element comprises neodymium.

14. The solid state laser device of claim 12, wherein said uniaxial crystal comprises Nd:YVO$_4$.

15. A dual wavelength continuous wave (cw) solid state laser device comprising:

a solid state gain material having a first gain transition at a first wavelength and a second gain transition at a second wavelength, said gain material defining a block having a first face and a second, opposite face, said first face having a reflective surface formed thereon that is substantially reflective at both said first and said second wavelengths; and an output coupler including a second reflective surface that is partially reflective at both said first and said second wavelengths, said second reflective face being oriented with respect to said first reflective face to define an optical cavity through said first and second faces of said solid state gain material.

16. The solid state laser device of claim 15, wherein said output coupler is formed on said second face of said gain material.

17. The solid state laser device of claim 15, and further comprising an optical pump source optically coupled through said first reflective face to end-pump said solid state gain material with continuous pump radiation at a pump wavelength that is highly absorptive by said gain material, and wherein said first face is highly transmissive to said pump radiation.

18. The solid state laser device of claim 17, and further comprising an optical fiber having a first end coupled to said optical pump source and a second end coupled to said first face of said gain material, so that said pump radiation is supplied through said optical fiber to pump said solid state gain material.

19. The solid state laser device of claim 15, wherein said solid state gain material comprises a rare earth element.

20. The solid state laser device of claim 19, wherein said rare earth element comprises neodymium.

21. The solid state laser device of claim 19, wherein said solid state gain material comprises Nd:YVO$_4$.

22. The solid state laser device of claim 19, wherein said solid state gain material comprises a uniaxial crystal oriented within said optical cavity to provide said first and second lasing polarizations for said first and said second wavelengths.

23. The solid state device of claim 22, wherein said uniaxial crystal is doped with a rare earth element.

24. The solid state laser device of claim 22, wherein said rare earth element comprises neodymium.

25. The solid state laser device of claim 23, wherein said uniaxial crystal comprises Nd:YVO$_4$.

26. A dual wavelength continuous wave (cw) solid state laser device comprising:

a solid state gain material comprising a rare earth element having a first gain transition at a first wavelength and a second gain transition at a second wavelength, said gain material defining a block having a first face and a second, opposite face, said first face having a reflective surface formed thereon that is substantially reflective at both said first and said second wavelengths;

an optical pump source optically coupled through said first face to end-pump said solid state gain material with continuous pump radiation at a pump wavelength that is highly absorptive by said gain material; and an output coupler including a second reflective surface that is partially reflective at both said first and said second wavelengths, said second reflective face oriented with respect to said first reflective face to define an optical cavity through said first and second faces of said solid state gain material.

27. The solid state laser device of claim 26, wherein said output coupler is formed on said second face of said gain material.

28. The solid state laser device of claim 26, and further comprising an optical fiber having a first end coupled to said optical pump source and a second end coupled to said first face of said gain material, so that said pump radiation is supplied through said optical fiber to pump said solid state gain material.

29. The solid state laser device of claim 26, wherein said solid state gain material comprises Nd:YVO$_4$.

30. The solid state laser device of claim 29, wherein said first wavelength is approximately 1064 nm and said second wavelength is approximately 1342 nm.

31. A method of generating continuous wave (cw) laser radiation in a cavity including a block of solid state laser material comprising the steps of:

a) continuously end-pumping the block of solid state laser material with pump radiation;

b) within said cavity, simultaneously generating substantial first cw laser radiation at a first wavelength and substantial second cw laser radiation at a second wavelength; and c) outputting said first and second cw laser radiation from said cavity.

32. The method of claim 31, and further comprising the step of absorbing said pump radiation within a short absorption distance into said solid state laser material so that said first and said second laser radiations have a single longitudinal mode.

33. The method of claim 31, wherein said first cw laser radiation is generated at a first polarization and said second cw laser radiation is generated at a second, approximately parallel polarization.

34. The method of claim 31, wherein said first cw laser radiation is generated at a first polarization and said second cw laser radiation is generated at a second, approximately perpendicular polarization.

35. The method of claim 31, wherein said step b includes generating said first cw laser radiation using a first transition of a neodymium ion and generating said second cw laser radiation using a second transition of a neodymium ion.

36. The method of claim 35, wherein said first transition comprises the $^4F_{3/2}$ to $^4I_{11/2}$ transition and the second transition comprises the $^4F_{3/2}$ $^4I_{13/2}$ transition.

37. The method of claim 35, wherein said gain material comprises Nd:YVO$_4$ and said first transition is centered at approximately 1064 nm and said second transition is centered at approximately 1342 nm.

* * * * *